United States Patent [19]

F'Geppert

[11] 4,316,678
[45] Feb. 23, 1982

[54] MEANS FOR SECURING TWO ELEMENTS AGAINST RELATIVE AXIAL MOVEMENT

[75] Inventor: Erwin F'Geppert, Novi, Mich.

[73] Assignee: The United States of America as represented by the Secretary of the Army, Washington, D.C.

[21] Appl. No.: 82,398

[22] Filed: Oct. 5, 1979

[51] Int. Cl.³ .............................. F16B 9/00; F16B 2/00
[52] U.S. Cl. .................................. 403/259; 403/261; 403/362; 403/370
[58] Field of Search ................. 403/259, 261, 16, 362, 403/370

[56] References Cited
U.S. PATENT DOCUMENTS 2,718,415  9/1955  Reynolds ..................... 403/362 X
3,606,406  9/1971  Walters ........................... 403/261 X
3,951,048  4/1976  Bloom, Jr. et al. ............. 403/261 X
4,012,154  3/1977  Durwin et al. ..................... 403/261
4,019,824  4/1977  Percy ................................ 403/261
4,136,989  1/1979  Bianco ............................... 403/261

Primary Examiner—James Kee Chi
Attorney, Agent, or Firm—Peter A. Taucher; John E. McRae; Nathan Edelberg

[57] ABSTRACT

Means to mount an element to be powered on a drive shaft are shown. The element to be powered fits against a shoulder on the shaft. A retainer ring is next slipped onto the shaft against the element, and a snap ring is put in place in a groove in the shaft. Three plugs in the retainer ring are screwed against the element to clamp the assembly longitudinally between the shoulder and the snap ring.

1 Claim, 4 Drawing Figures

MEANS FOR SECURING TWO ELEMENTS AGAINST RELATIVE AXIAL MOVEMENT

The invention described herein may be manufactured, used, and licensed by or for the Government for governmental purposes without payment to me of any royalty thereon.

BACKGROUND AND SUMMARY OF THE PRIOR ART

One problem in assemblies of the type here involved is called "play" or looseness in the assembly. A small amount of axial play can and often does results in repetitive axial movement back and forth between the stops, which produces a hammering action and is very destructive.

The prior art which this invention replaces comprises a shouldered shaft and a component held against the shoulder by a nut screwed tight against the component. A keyway is cut in the threaded portion to receive a tab (extending radially inward) on a lock washer which has a peripheral tab adapted to be hammered against a flat on the nut. The lock washer is clamped between the nut and the component.

Such prior art device or method has a number of drawbacks, and this invention has these advantages over the conventional locking device:

1. Less expensive to make.
2. Reusable; when the conventional lock washer is removed, it is almost always so bent out of shape as to be useless, or the tab at the periphery breaks off.
3. The way some mechanics hammer the peripheral tab onto the nut, damage can and often does result to some part of the assembly.
4. Use of the conventional lock requires that the nut be turned to an arcuate position in which a flat rather than a corner is opposite the tab, which takes more time. In the invention lock means, the threaded plugs are screwed tight without regard to a final assembly indexing requirement.
5. The thread on the shaft in the conventional method is subject to damage, as by burring, etc. In a lock embodying the invention, the threaded portions are better shielded from damage.
6. In the conventional lock, if the peripheral tab bends away from the flat, or breaks off, the nut unscrews completely and the component comes off. In a lock device embodying this invention, if the threaded plugs back away from engagement, the assembly still does not come apart.
7. In a lock made according to this invention, the weight is more evenly distributed, so that there is less dynamic imbalance than in a conventional lock device. In very high speed applications, centrifugal imbalance can be a problem.

SUMMARY OF THE INVENTION

The invention is a means to secure two rotatable elements against axial shift relative to each other. In many, and perhaps most, of the applications, one of the elements is a shaft, but the invention is not thus limited. Two abutments form longitudinal stops against movement along the axis of rotation. Both abutments can comprise groove-and-snap ring combinations, although one of them may be a shoulder on the shaft. Other means of forming abutments will occur to those skilled in the art. An element may be a disc or a flange and has two faces, one of which is closely in contact with an abutment and the other face is spaced from the second abutment. An annulus, in the space between the second face and the second abutment, carries a plurality (preferably three) threaded plugs which are screwed longitudinally to clamp the assembly tight longitudinally against the two abutments.

It is accordingly an object of the invention to secure two elements against relative rotation by extending their effective longitudinal dimension between two axial abutments and into tight frictional engagement therewith.

IN THE DRAWINGS

DESCRIPTION OF THE STRUCTURE

Figure 1:
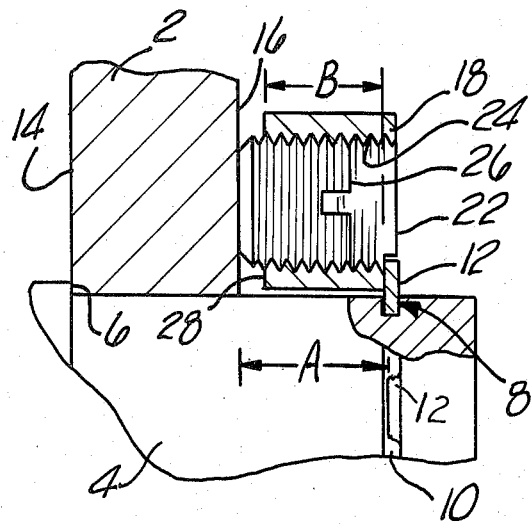
FIG. 1 is a longitudinal section through a rotatable assembly embodying the invention, showing a preferred form and being one which can be readily applied to existing structures.

FIG. 1 shows two rotatable elements 2 and 4 which must be secured against axial shift relative to each other. Element 4 is shown as a shaft, and element 2 could be a hub of some machine part that is driven by the shaft. A shoulder 6 on element 4 provides an abutment which resists longitudinal displacement, leftward as here shown, of element 2 on element 4.

Figure 2:
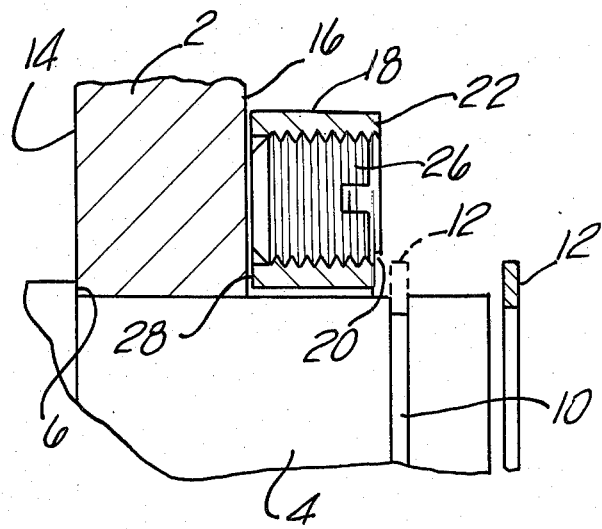
FIG. 2 shows the embodiment of FIG. 1 but in a partially completed stage of assembly.

A second abutment 8 is provided, spaced a substantial distance from the first abutment 6. As is better seen in FIG. 2, the second abutment comprises a groove 10 and a snap ring 12. Element 2 is a two-faced machine element; specifically, on the left as seen in FIGS. 1 and 2, element 2 has a face 14, and on the right is a face 16. The first of these, namely face 14, tightly engages the first abutment 6, and the second face, 16, is spaced from abutment 8 by a dimension A.

A retaining ring 18 is disposed in the longitudinal space provided by dimension A. As is best seen in FIG. 2, one of the inner edges of ring 18 is undercut as at 20. Specifically, the undercut 20 is in the face 22 which is toward abutment 8 and is provided to receive snap ring 12. The aforesaid dimension A measures the longitudinal spacing of face 16 from abutment 8. Dimension B is the width of ring 18 at its inside diameter, which takes the undercut 20 into account as can be seen from FIG. 1. It can also be seen there that longitudinal dimension B is less than longitudinal dimension A. The difference, A minus B, is provided to permit assembly of the pieces.

Ring 18 is provided with circumferentially spaced openings, one of which is shown at 24, preferably three in number, threaded to receive threaded plugs or set screws 26. The longitudinal dimension of each plug 26 is preferably no more than dimension B, in order that the plugs may be retained in the threaded openings 24, for assembly, without protruding from the left face 28 of ring 18 and without protruding into the undercut 20; see especially FIG. 2.

In the assembly, snap ring 12 is pushed by the forces involved against the "tight" side of groove 10, i.e., away from element 2.

It may be noted here that, if desired, the embodiment shown in FIGS. 1 and 2 may be used in devices already in use and manufactured originally with the conventional lock washer and threaded shaft referred to above, in cases in which the thread on the shaft is seriously damaged, or if simply it is decided to abandon the original locking means. Such an adaptation would require grooving the shaft in the threaded portion thereof.

THE EMBODIMENT OF FIG. 3

Figure 3:
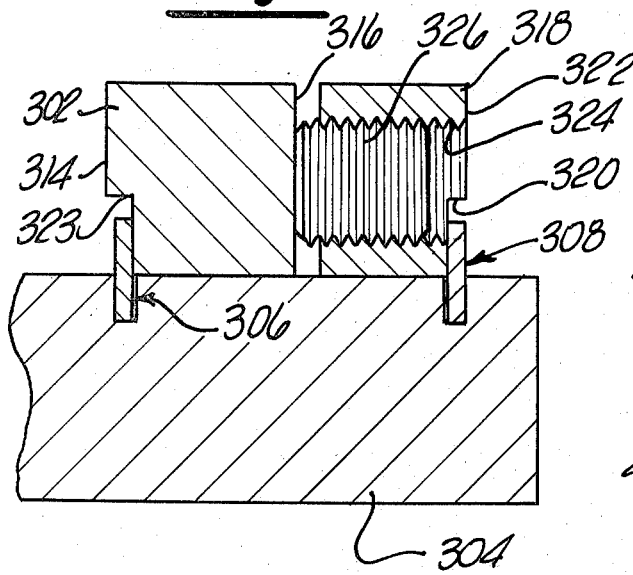
FIG. 3 shows another embodiment of the invention in which both abutments include snap rings.

In the FIG. 3 embodiment, elements 302 and 304 are shown secured against relative axial shift by lock means in which the two abutments 306 and 308 are both provided by groove-and-ring structures. Element 302 also is two-faced as shown at 314 and 316. A ring 318 is provided with an undercut as at 320 in its face 322. Because abutment 306 in this embodiment is also a groove-and-ring combination, face 314 is undercut as at 323.

Ring 318 is provided with a plurality of circumferentially spaced threaded openings, one of which is shown at 324. Each opening carries a threaded plug 326.

THE EMBODIMENT OF FIG. 4

Figure 4:
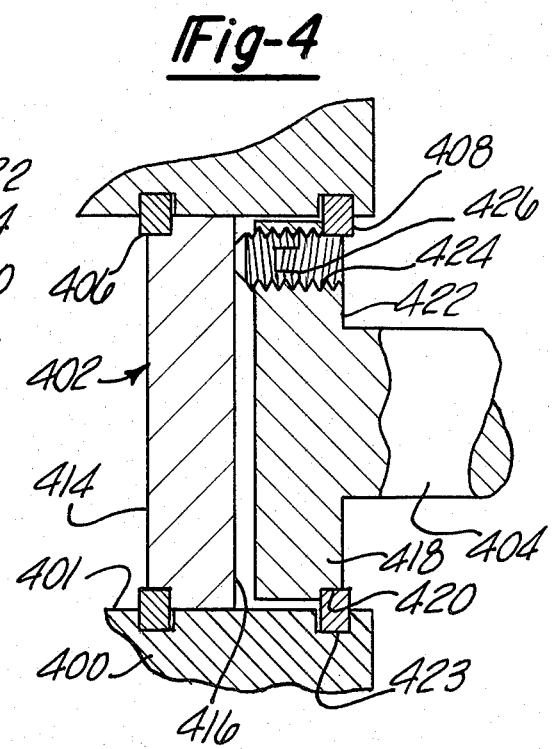
FIG. 4 shows an embodiment in which the invention is applied to a machine part having a central opening or bore.

The FIG. 4 embodiment shows a rotatable machine part 400 having a central opening 401 which receives an element 402 intended to rotate with the part 400. Another element 404 is disposed in opening 401 for rotation with element 402 and to be secured against axial shift relative thereto. Abutments 406 and 408 are provided, both in the form of groove-and-ring combinations. Element 402 has on its opposite sides the two faces 414 and 416, with face 414 in tight juxtaposition with abutment 406 and peripherally grooved to receive the snap ring portion of abutment.

In this embodiment, the retaining ring 418 is formed integral with element 404. Where the embodiment shown in FIG. 2 is provided with ring 18 having the undercut 20, the embodiment of FIG. 4, in its retaining ring 418, is provided with an external peripheral recess 420 to receive the snap ring 408 and hold it against inadvertent radial displacement which would allow the assembly to fall apart. Recess (or groove) 420 lies in the external periphery of retaining ring 418, as aforesaid, and also in the face 422 which comes against abutment 408 in the final assembly. There is a corresponding internal peripheral groove 423 in the bore 401, axially aligned with groove 420, which cooperates with groove 420 to accommodate the snap ring forming the aforesaid abutment 408.

Retaining ring 418 is provided with circumferentially spaced threaded openings, as at 424, and a threaded plug 426 in each such opening. The peripheral groove 420 extends radially inward far enough to overlap the openings 424 so as to block plugs 426 from total disengagement with the retaining ring.

OPERATION

A description of the embodiment shown in FIGS. 1 and 2 will serve to show how the invention is used and how it functions. FIG. 2 shows the parts in an intermediate stage of assembly. To assemble the hardware, the assembler places element 2 on shaft 4 with face 14 against shoulder 6. Retaining ring 18 is made ready for the assembly by threading plugs 26 into their openings 24 so that the left end of each plug does not extend beyond face 28 and the right end does not extend into undercut 20.

Ring 18 is then slipped onto shaft 4 until face 28 is close to or in contact with face 16 of element 2. Snap ring 12 can then be snapped into place in groove 10, after which plugs 26 are turned to advance leftward in ring 18 as seen in FIG. 2 until face 14 is tightly engaged with abutment 6 and face 22 is tightly engaged (by way of undercut 20) with abutment 8. The assembled condition is shown in FIG. 1.

The parts thus assembled will rotate as a unit without axial shift. The groove providing the undercut 20 will normally suffice to keep snap ring 12 from popping out of its groove.

Operation of the embodiments shown in FIGS. 3 and 4 will be apparent from the foregoing description, to persons skilled in the art.

I wish it to be understood that I do not desire to be limited to the exact details of construction shown and described for obvious modifications will occur to a person skilled in the art.

What is claimed is:

1. Means to secure a machine part (2) on a shaft (4), comprising a first peripheral abutment (6 or 306) on the shaft to engage one end face of the machine part; a peripheral groove (10) formed in the shaft remote from said abutment; a resilient snap ring (12 or 308) installable in the groove to form a second abutment; an annular one piece retaining ring (18 or 318) insertable on the shaft into the space between the machine part and the second abutment; said retaining ring having a first end face (28) in opposed relation to the machine part and a second end face (22 or 322) in opposed relation to the second abutment; said second end face of the retaining ring having an annular undercut (20 or 320) at the inner diameter of the ring to mate with the snap ring; said retaining ring having at least three threaded openings extending axially therethrough at spaced locations around the ring periphery; set screws (26 or 326) engaged with the threads in individual ones of the threaded openings for individual advancement against the machine part to force the machine part into tight pressure engagement with the first abutment and the retaining ring into tight pressure engagement with the second abutment; the set screws having lesser lengths than the axial thickness of the retaining ring whereby each screw can be disposed entirely within the retaining ring; the combined axial thickness of the machine part and retaining ring being slightly less than the spacing between the first and second abutments to permit installation of the resilient snap ring into the shaft groove after positionment of the retaining ring and machine part on the shaft; the aforementioned undercut on the retaining ring having a slightly larger diameter than the aforementioned snap ring so that when the retaining ring and machine part are in pressure engagement with respective ones of the abutments, the snap ring will be located within the undercut, whereby the snap ring is then prevented from being accidentally radially disengaged from the groove in the shaft; the threaded openings in the retaining ring intersecting the undercut in the second end face of the retaining ring, whereby when the snap ring is located within the undercut the snap ring will cover a portion of each threaded opening to prevent accidental retraction of the set screws out of the threaded openings.

* * * * *